United States Patent
Dauvois et al.

(10) Patent No.: US 7,352,861 B2
(45) Date of Patent: Apr. 1, 2008

(54) DIGITAL ELECTRONIC COMPONENT WHICH IS PROTECTED AGAINST ELECTRICAL-TYPE ANALYSES

(75) Inventors: Jean-Luc Dauvois, Le Mans (FR); Jérôme Perrine, Versailles (FR)

(73) Assignee: Nagra Thomson Licensing, Boulogne-Billancourt (FR)

( * ) Notice: Subject to any disclaimer, the term of this patent is extended or adjusted under 35 U.S.C. 154(b) by 55 days.

(21) Appl. No.: 10/498,605

(22) PCT Filed: Dec. 11, 2002

(86) PCT No.: PCT/FR02/04285

§ 371 (c)(1), (2), (4) Date: Jul. 5, 2005

(87) PCT Pub. No.: WO03/050750

PCT Pub. Date: Jun. 19, 2003

(65) Prior Publication Data

US 2006/0013392 A1   Jan. 19, 2006

(30) Foreign Application Priority Data

Dec. 13, 2001 (FR) .................. 01 16114

(51) Int. Cl.
*H04K 1/04* (2006.01)
*H04K 1/06* (2006.01)
*H04K 1/00* (2006.01)
*H04L 9/00* (2006.01)
*H04L 9/32* (2006.01)
*G06F 11/30* (2006.01)
*G06F 12/14* (2006.01)
*G06K 19/06* (2006.01)
*G06K 5/00* (2006.01)
*G06F 17/00* (2006.01)

(52) U.S. Cl. .............. 380/35; 380/287; 380/46; 380/255; 235/492; 235/375; 235/380; 235/382; 713/194

(58) Field of Classification Search ............ 380/287, 380/35, 46, 255; 713/194; 235/492, 375, 235/380, 382
See application file for complete search history.

(56) References Cited

U.S. PATENT DOCUMENTS 5,874,520 A    2/1999  Orth
6,419,159 B1 *  7/2002  Odinak .................. 235/492

FOREIGN PATENT DOCUMENTS

EP    0482975 B1   12/1993
EP    0772058 B1    1/2003
WO   WO97/17667    5/1997

OTHER PUBLICATIONS

First Office Action issued Apr. 7, 2006, in the prosecution of Chinese Patent Application No. 02824766.3, with English translation (16 pages).

* cited by examiner

*Primary Examiner*—Ayaz Sheikh
*Assistant Examiner*—Shin-Hon Chen
(74) *Attorney, Agent, or Firm*—Osha Liang LLP

(57) ABSTRACT

This invention relates to a digital electronic component which is protected against electrical- and/or electromagnetic-type analyse). The inventive component comprises: a synchronous element (10) which is controlled by a clock (H); means (11, 12) of generating said clock (H), the frequency of which varies randomly between a minimum value and a maximum value for at least a given period of time; and means (13) of controlling the random nature of the frequency change of said clock (H).

7 Claims, 1 Drawing Sheet

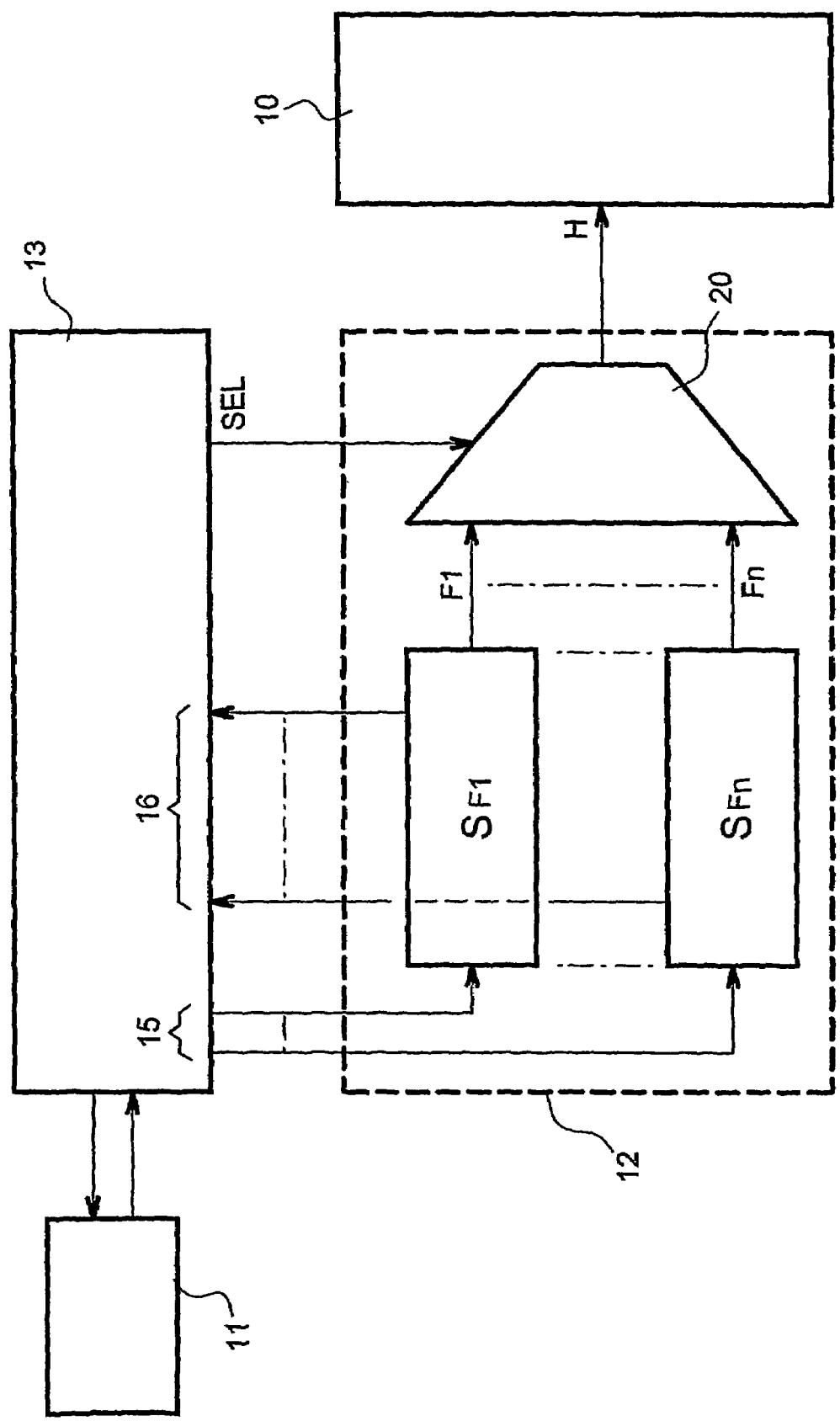

DIGITAL ELECTRONIC COMPONENT WHICH IS PROTECTED AGAINST ELECTRICAL-TYPE ANALYSES

TECHNICAL FIELD

The present invention concerns a digital electronic component that is protected against electrical and/or electromagnetic type analyzes, more particularly in the field of the chip card.

STATE OF THE ART

The field of the invention is in the implementing in a digital electronic component, for example in a chip card, of mechanisms to combat data extraction (usually with an encryption key) by means of an analysis of the current consumption, or by analysis of the emitted electromagnetic radiation. These analyzes are generally called SPA ("Simple Power Analysis")/DPA ("Differential Power Analysis") or SEMA ("Simple Electrical Magnetic Analysis")/DEMA ("Differential Electrical Magnetic Analysis").

Using these analyzes it is possible to determine what the central unit of a chip card is doing, which data are being manipulated by the latter. It is possible thereby to access the single (or plurality of) secret key(s) used for transmitting this data. Such an intrusion may be done without any risk, because it will not be possible to prove afterwards that it has happened since the component remains unaltered.

As described in the article of Paul Kocher, Joshua Jaffe and Benjamin Jun entitled "Introduction to differential power analysis and related attack" (Internet site www.crytograhy.com, Cryptography Research, 1998), these methods of analysis may have important impacts, because they allow to extract secret keys used for encrypted communications. Furthermore, such attacks may be set up rapidly and implemented using easily available equipment. The amount of time required to realize these attacks depends on the type of attack (DPA, SPA) and varies as a function of the considered component. An SPA attack may take a few seconds for a component while a DPA attack may take many hours.

Nowadays digital electronics are minimally or not protected against such electrical or electromagnetic analyzes. Two families of attacks exist: the one is purely software, the other is purely hardware. In the case of data manipulated by the central unit of a chip card:
- in the first family, one technical solution consists in rendering the current consumption as random as possible, this current consumption being linked the less possible to the data manipulated by the central unit. This way it is possible to randomize the sequence of the instructions, or render as random as possible the data manipulated.
- in the second family it is possible to:
    - either render the current as steady as possible so as to make it very difficult to realize a link between the current consumption and the instructions manipulated by the central unit,
    - or randomize the current consumption so as to desynchronize two identical operations of the central unit.

The invention belongs in this second case.

A European patent application EP 1 113 386 describes a solution to protect a chip card against such attacks. In this solution, two condensators are embedded in the chip card such that at any time one of them is charged by an external power supply and the other is discharged by activating the component of the chip card. The roles of the two condensators rapidly alternate and the power supply is isolated from the component of the chip card in the sense that analyzes of the current consumptions do not produce any information about the operation of this component.

The aim of the invention is to solve the problem described here above, by varying in a random fashion the speed of operation of a considered digital electronic component, for example a chip card, such as to render SPA/DPA and/or SEMA/DEMA analyzes difficult, and perhaps impossible.

SUMMARY OF THE INVENTION

The invention relates to a digital electronic component which is protected against analyzes of the electrical and/or electromagnetic type comprising a synchronous element driven by a clock, characterized in that it comprises means for generating of this clock, the frequency of which varies randomly between a minimum value and a maximum value during at least a given time period, and means for controlling the random nature of the frequency change of the clock.

The means for generating of a clock may comprise a random frequency instruction generator that commands a frequency generator.

The frequency generator may comprise at least two frequency synthesizers, or PLL circuits ("Phase Locked Loop"), and means for switching between these synthesizers, or circuits.

The synchronous element may be the central unit of a chip card, a memory, or a cabled synchronous function, for example of the FPGA type ("Field, Programmable Gate Arrays") or ASIC type ("Application specific integrated Circuit").

The range of frequency variation must be as wide as possible to disturb at a maximum analyzes of DPA/SPA and DEMA/SEMA type. The considered random is a real random, because in this case it is not a phase or frequency shift of the clock, but a driven random frequency change. By disturbing the clock in this manner the current consumption of the synchronous element is rendered random.

BRIEF DESCRIPTION OF THE DRAWINGS

The only Figure illustrates a digital electronic component that is protected against attacks of the electrical and/or electromagnetic type.

DETAILED DESCRIPTION OF PARTICULAR EMBODIMENTS

As illustrated in the Figure the digital electronic component that is protected against attacks of the electrical and/or electromagnetic type according to the invention, for example of a chip card, comprises:
- a central unit 10 of this chip card,
- a random frequency instruction generator 11,
- a frequency generator 12 driven by this generator 10, that provides to this central unit 10 a clock H, the frequency of which varies in a random manner between a minimum value and a maximum value,
- a controller 13 that aims at measuring the frequency of the clock H and verifying the real random operation of the frequency change.

The frequency excursion of the clock H, which is as great as possible, is comprised between 1 Mhz and 100 Mhz.

In the example of embodiment illustrated in the Figure, the frequency generator 12 comprises at least two frequency synthesizers SF1 . . . SFn controlled by signals provided from outputs 15 of the controller 13, and a multiplexing and synchronizing circuit 20 receiving the outputs F1. . . Fn of these synthesizers SF1 . . . SFn.

At the occurrence of a frequency change, before selecting one of the frequencies at the output of the synthesizers SF1 . . . SFn by sending a signal SEL on the multiplexing and synchronizing circuit 20, the controller 13 verifies that there are no possible disturbances by analyzing the signals received at its inputs 16.

The controller 13 may hence operate in the following manner:

request from the random frequency instruction generator 11 of a new value, value provided by this generator 11 to the controller 13, verifying by the controller 13 of the random nature of this value as compared to previous values, sending of this value to the synthesizers SF1 . . . SFn.

The invention allows to randomize the operation of the central unit, that performs the calculations, and to give an appearance of random current consumption. Analyzes SPA/DPA and/or SEMA/DEMA are difficult, perhaps impossible to make because they require a considerable increase of the number of current analyzes.

The invention allows not to modify the central unit as such, and to operate it in its own range of frequencies.

The ability of the invention to protect itself depends from the random frequency instruction generator and from the frequency change cycle depending on the length of an instruction cycle of the central unit.

In an advantageous embodiment, the controller may be driven by the central unit.

In an alternative operation it is possible to activate the random frequency change of the clock H according to the invention only during a given time period in cases considered as critical.

The invention claimed is:

1. A digital electronic component that is protected against analyzes of the electrical and electromagnetic type comprising a synchronous element driven by a clock, wherein the clock comprises a random frequency instruction generator and wherein the frequency of the clock varies in a random manner between a minimum value and a maximum value during at least a given time period; and wherein the frequency generator comprises at least at least two PLL circuits as frequency synthesizers and means for switching from a first frequency to a second frequency by switching from a first PLL circuit to a second PLL circuit.

2. The component according to claim 1, in which the synchronous element is the central unit of a chip card.

3. The component according to claim 2, in which the controller is driven by the central unit.

4. The component according to claim 1, in which the synchronous element is a memory.

5. The component according to claim 1, in which the synchronous element is a cabled synchronous function.

6. The component according to claim 1, in which the frequency excursion of the clock is between 1 Mhz and 100 Mhz.

7. The component according to claim 1, further comprising means for controlling the random manner of the clock.

* * * * *